US009819248B2

(12) United States Patent
Kulkarni et al.

(10) Patent No.: US 9,819,248 B2
(45) Date of Patent: Nov. 14, 2017

(54) ASSEMBLIES AND METHODS FOR COOLING ELECTRIC MACHINES

(71) Applicant: TECO-Westinghouse Motor Company, Round Rock, TX (US)

(72) Inventors: Devdatta P. Kulkarni, Austin, TX (US); Gabriel Rupertus, Austin, TX (US); Edward Chen, Austin, TX (US); Lex Ramsey, Austin, TX (US)

(73) Assignee: TECO-Westinghouse Motor Company, Round Rock, TX (US)

(*) Notice: Subject to any disclaimer, the term of this patent is extended or adjusted under 35 U.S.C. 154(b) by 631 days.

(21) Appl. No.: 13/791,045

(22) Filed: Mar. 8, 2013

(65) Prior Publication Data

US 2014/0183986 A1 Jul. 3, 2014

Related U.S. Application Data

(60) Provisional application No. 61/747,825, filed on Dec. 31, 2012.

(51) Int. Cl.
*H02K 9/22* (2006.01)
*H02K 15/00* (2006.01)
*H02K 1/20* (2006.01)
*H02K 1/32* (2006.01)

(52) U.S. Cl.
CPC .............. *H02K 9/22* (2013.01); *H02K 1/20* (2013.01); *H02K 1/32* (2013.01); *Y10T 29/49009* (2015.01); *Y10T 29/49012* (2015.01)

(58) Field of Classification Search
CPC .. H02K 1/20; H02K 1/32; H02K 9/22; H02K 15/00; Y10T 29/49009; Y10T 29/49012

USPC ......... 310/43, 52, 56, 201, 216, 260, 54, 58; 29/596

See application file for complete search history.

(56) References Cited

U.S. PATENT DOCUMENTS

| | | | | | |
|---|---|---|---|---|---|
| 1,839,078 | A | | 12/1931 | Alger | 310/183 |
| 2,530,533 | A | * | 11/1950 | Moody | H02K 5/04 29/596 |
| 2,977,491 | A | * | 3/1961 | Hueffed | H02K 1/185 310/216.129 |
| 3,014,139 | A | * | 12/1961 | Shildneck | H02K 3/22 174/114 R |
| 3,188,833 | A | * | 6/1965 | Robinson | H02K 9/20 310/54 |
| 3,476,960 | A | * | 11/1969 | Rees | H02K 7/145 174/138 D |
| 4,330,726 | A | * | 5/1982 | Albright | H02K 3/47 174/DIG. 20 |
| 4,877,985 | A | | 10/1989 | Byrd et al. | 310/86 |

(Continued)

FOREIGN PATENT DOCUMENTS

| | | |
|---|---|---|
| EP | 0501787 | 9/1992 |
| EP | 1931017 | 6/2008 |

(Continued)

*Primary Examiner* — John K Kim
(74) *Attorney, Agent, or Firm* — Norton Rose Fulbright US LLP

(57) ABSTRACT

Cooling assemblies and methods, including, for example, at least one bar (e.g., electrically insulated and/or thermally conductive bar(s)), members (e.g., i-beams, rectangular members, and the like), stator laminations, rotor laminations, and/or combinations thereof, such as those configured to cool electric machines (e.g., electric motors and generators).

14 Claims, 6 Drawing Sheets

(56) References Cited

U.S. PATENT DOCUMENTS

| | | | | |
|---|---|---|---|---|
| 5,583,388 | A | * | 12/1996 | Paroz .................... H02K 3/505 310/260 |
| 5,783,877 | A | | 7/1998 | Chitayat ......................... 310/12 |
| 6,023,838 | A | * | 2/2000 | Yamakoshi ............. H02K 5/04 29/596 |
| 6,140,719 | A | | 10/2000 | Kalsi .............................. 310/52 |
| 6,455,977 | B2 | * | 9/2002 | Leyvraz .................... H02K 1/16 310/216.014 |
| 6,815,848 | B1 | * | 11/2004 | Glew ...................... H02K 5/20 310/402 |
| 6,954,010 | B2 | * | 10/2005 | Rippel .................... H02K 1/20 310/216.014 |
| 7,498,710 | B2 | | 3/2009 | Rao .............................. 310/201 |
| 7,655,868 | B2 | * | 2/2010 | Sheaffer ................. H02K 3/30 174/120 R |
| 7,969,049 | B2 | | 6/2011 | Laskaris et al. ............... 310/52 |
| 8,174,173 | B2 | | 5/2012 | Makino et al. ............... 310/400 |
| 8,242,644 | B2 | | 8/2012 | Booth et al. .................. 310/52 |
| 2001/0022482 | A1 | * | 9/2001 | Leyvraz ................. H02K 1/16 310/429 |
| 2004/0104638 | A1 | * | 6/2004 | Yoneda ................. H02K 1/148 310/216.012 |
| 2004/0135461 | A1 | * | 7/2004 | Miyake ................. H02K 1/148 310/266 |
| 2006/0017331 | A1 | | 1/2006 | Desailly et al. ................ 310/12 |
| 2006/0150396 | A1 | | 7/2006 | Sweo ............................ 29/596 |
| 2006/0232147 | A1 | | 10/2006 | Cheng ........................... 310/52 |
| 2007/0013240 | A1 | | 1/2007 | Aiello et al. .................... 310/52 |
| 2007/0228846 | A1 | | 10/2007 | Rao ................................ 310/52 |
| 2008/0136269 | A1 | | 6/2008 | Kaihatsu et al. ............... 310/42 |
| 2008/0143199 | A1 | | 6/2008 | Laskaris et al. ............... 310/52 |
| 2008/0197724 | A1 | | 8/2008 | Cullen et al. .................. 310/53 |
| 2009/0174278 | A1 | * | 7/2009 | Sheaffer .................. H02K 3/30 310/201 |
| 2010/0102648 | A1 | | 4/2010 | Tetzlaff et al. ................. 310/52 |
| 2012/0062054 | A1 | | 3/2012 | Bradfield ....................... 310/52 |
| 2012/0112571 | A1 | | 5/2012 | Stephens ....................... 310/55 |
| 2014/0183986 | A1 | * | 7/2014 | Kulkarni ................. H02K 1/20 310/52 |
| 2015/0145367 | A1 | * | 5/2015 | Li ....................... H02K 1/2773 310/156.08 |
| 2015/0295460 | A1 | * | 10/2015 | Ekin ....................... H02K 1/30 310/43 |

FOREIGN PATENT DOCUMENTS

| | | |
|---|---|---|
| EP | 2403112 | 1/2012 |
| GB | 1277492 | 6/1972 |
| JP | 57196849 | 12/1982 |
| JP | 57196850 | 12/1982 |
| JP | 2002191149 | 7/2002 |
| JP | 2003158842 | 5/2003 |
| JP | 3774546 | 5/2006 |
| JP | 2009189104 | 8/2009 |
| JP | 2010081675 | 4/2010 |
| WO | WO 2012/036945 | 3/2012 |

* cited by examiner

ASSEMBLIES AND METHODS FOR COOLING ELECTRIC MACHINES

CROSS-REFERENCE TO RELATED APPLICATIONS

This application claims priority to U.S. Provisional Patent Application No. 61/747,825, filed Dec. 31, 2012, which is incorporated by reference in its entirety.

BACKGROUND

1. Field of the Invention

The present invention relates generally to cooling assemblies and methods, including, for example, at least one bar (e.g., electrically insulated and/or thermally conductive bar(s)), members (e.g., i-beams, rectangular members, and the like), stator laminations, rotor laminations, and/or combinations thereof, and more particularly, but not by way of limitation, to cooling assemblies and methods configured to cool electric machines (e.g., electric motors and generators).

2. Description of Related Art

Examples of cooling assemblies are shown in, for example, U.S. Patent Publication Nos. 2008/0143199, 2008/0197724, and 2012/0062054.

SUMMARY

This disclosure includes embodiments of cooling assemblies and methods, including, for example, at least one bar (e.g., electrically insulated and/or thermally conductive bar(s)), members (e.g., i-beams, rectangular members, and the like), stator laminations, rotor laminations, and/or combinations thereof, and more particularly, but not by way of limitation, to cooling assemblies and methods configured to cool electric machines (e.g., electric motors and generators).

Some embodiments of the present cooling assemblies comprise a stator core comprising a plurality of laminations and having a first end, a second end, and a bore extending from the first end to the second end of the stator core and configured to accommodate at least a portion of a rotor, the bore characterized by a longitudinal axis, where at least some laminations in the plurality of laminations comprise at least one opening positioned at least between the first end and the second end of the stator core; and at least one bar disposed in the at least one opening, where the at least one bar is not hollow and is electrically insulated from the at least some laminations.

Some embodiments of the present cooling assemblies comprise a stator core comprising a plurality of laminations and having a first end, a second end, and a bore extending from the first end to the second end of the stator core and configured to accommodate at least a portion of a rotor, the bore characterized by a longitudinal axis, where at least some laminations in the plurality of laminations comprise at least one opening positioned at least between the first end and the second end of the stator core; and at least one bar disposed in the at least one opening, where the at least one bar is electrically insulated from the at least some laminations and an interior of the at least one bar is not in fluid communication with a fluid source.

Some embodiments of the present cooling assemblies comprise a stator core comprising a plurality of laminations and having a first end, a second end, and a bore extending from the first end to the second end of the stator core and configured to accommodate at least a portion of a rotor, the bore characterized by a longitudinal axis, where at least some laminations in the plurality of laminations comprise at least one opening positioned at least between the first end and the second end of the stator core; a plurality of members disposed between at least two adjacent laminations in the plurality of laminations such that the at least two adjacent laminations form at least one channel that extends at least partially around the stator core; and at least one bar disposed in the at least one opening, where the at least one bar is electrically insulated from the at least some laminations.

Some embodiments of the present cooling assemblies comprise a rotor core comprising a plurality of laminations and having a first end, a second end, and a bore extending from the first end to the second end of the rotor core and configured to accommodate at least a portion of a rotor shaft, the bore characterized by a longitudinal axis; an end plate disposed at the first end and an end plate disposed at the second end, where at least some laminations in the plurality of laminations comprise at least one opening positioned at least between the first end and the second end of the rotor core; and at least one bar disposed in the at least one opening, where the at least one bar is electrically insulated from the at least some laminations.

Some embodiments of the present cooling assemblies comprise a rotor core comprising a plurality of laminations and having a first end, a second end, and a bore extending from the first end to the second end of the rotor core and configured to accommodate at least a portion of a rotor shaft, the bore characterized by a longitudinal axis, where at least some laminations in the plurality of laminations comprise at least one opening positioned at least between the first end and the second end of the rotor core; a plurality of members disposed between at least two adjacent laminations in the plurality of laminations such that the at least two adjacent laminations form at least one channel that extends at least partially around the rotor core; and at least one bar disposed in the at least one opening, where the at least one bar is electrically insulated from the at least some laminations.

Some embodiments of the present cooling assemblies comprise a rotor core comprising a plurality of laminations and having a first end, a second end, and a bore extending from the first end to the second end of the rotor core and configured to accommodate at least a portion of a rotor shaft, the bore characterized by a longitudinal axis, where at least some laminations in the plurality of laminations comprise at least one opening positioned at least between the first end and the second end of the rotor core; and at least one bar disposed in the at least one opening, where the at least one bar is electrically insulated from the at least some laminations and does not share the at least one opening with another component of the rotor core.

Some embodiments of the present cooling assemblies comprise a stator core comprising a plurality of stator laminations and having a first end, a second end, and a stator bore extending from the first end to the second end of the stator core and configured to accommodate at least a portion of a rotor, the stator bore characterized by a first longitudinal axis, where at least some stator laminations in the plurality of stator laminations comprise at least one stator opening positioned at least between the first end and the second end of the stator core; a rotor core disposed at least partially within the stator bore, the rotor core comprising a plurality of rotor laminations and having, a first end, a second end, and a rotor bore extending from the first end to the second end of the rotor core and configured to accommodate at least a portion of a rotor shaft, the rotor bore characterized by a second longitudinal axis, where at least some rotor laminations in the plurality of rotor laminations comprise at least one rotor opening positioned at least between the first end and the second end of the rotor core; at least one stator bar disposed in the at least one stator opening of the at least some stator laminations in the plurality of stator laminations, where the at least one stator bar is electrically insulated from the at least some stator laminations; and at least one rotor bar disposed in the at least one rotor opening of the at least some rotor laminations in the plurality of rotor laminations, where the at least one rotor bar is electrically insulated from the at least some rotor laminations.

Some embodiments of the present methods comprise cutting at least one opening in at least some of a plurality of stator laminations such that when the at least some stator laminations are assembled, the at least one opening is positioned at least between a first end and a second end of a stator core; assembling the plurality of stator laminations to form at least a portion of a stator core; and disposing at least one bar in the at least one opening, where the at least one bar is not hollow and is electrically insulated from the at least some laminations.

Some embodiments of the present methods comprise cutting at least one opening in at least some of plurality of rotor laminations such that when the at least some rotor laminations are assembled, the at least one opening is positioned at least between a first end and a second end of a rotor core; assembling the plurality of rotor laminations to form at least a portion of a rotor core; and disposing at least one bar in the at least one opening, where the at least one bar is electrically insulated from the at least some laminations.

The term "coupled" is defined as connected, although not necessarily directly, and not necessarily mechanically. Two items are "couplable" if they can be coupled to each other. Unless the context explicitly requires otherwise, items that are couplable are also decouplable, and vice-versa. One non-limiting way in which a first structure is couplable to a second structure is for the first structure to be configured to be coupled (or configured to be couplable) to the second structure. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a cooling assembly, or components of a cooling assembly that "comprises," "has," "includes," or "contains" one or more elements or features possesses those one or more elements or features, but is not limited to possessing only those elements or features. Likewise, a method that "comprises," "has," "includes," or "contains" one or more steps possesses those one or more steps, but is not limited to possessing only those one or more steps. Additionally, terms such as "first" and "second" are used only to differentiate structures or features, and not to limit the different structures or features to a particular order.

Any embodiment of any of the present cooling assemblies and methods can consist of or consist essentially of—rather than comprise/include/contain/have—any of the described elements and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures illustrate the described elements using graphical symbols that will be understood by those of ordinary skill in the art. The embodiments of the present cooling assemblies and their components shown in the figures are drawn to scale for at least the embodiments shown.

DESCRIPTION OF ILLUSTRATIVE EMBODIMENTS

Figure 1:
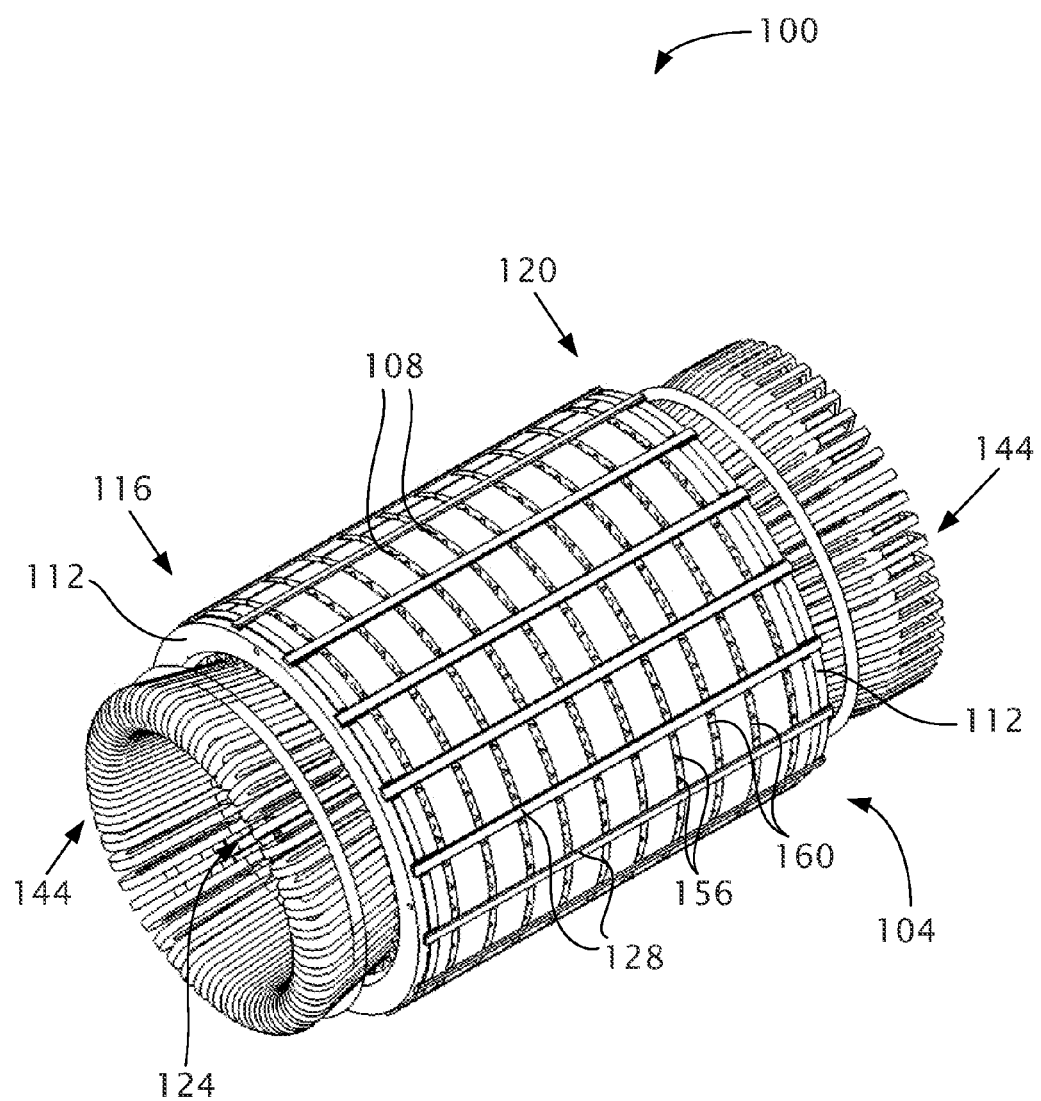
FIG. 1 depicts a perspective view of one embodiment of the present cooling assemblies with a plurality of bars disposed in a stator core.
Figure 2:
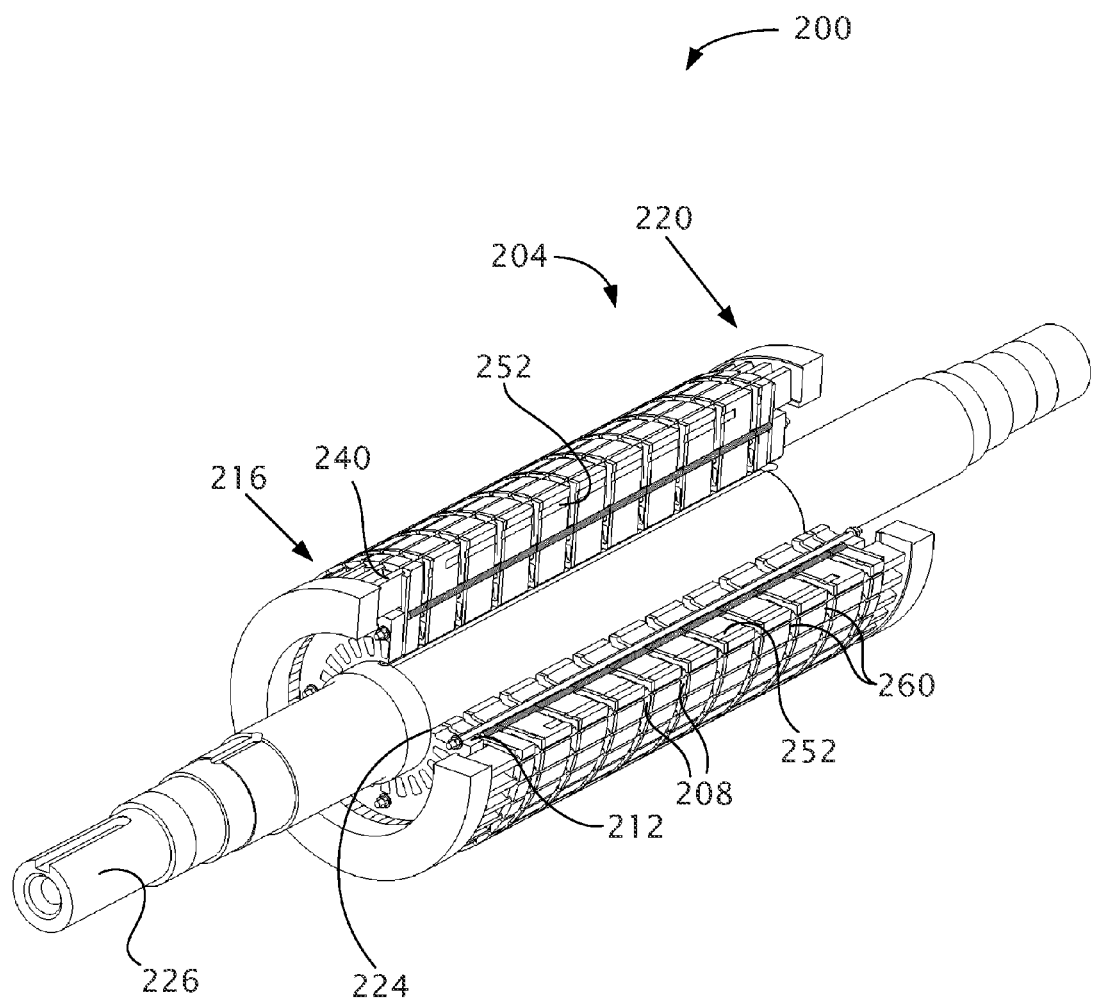
FIG. 2 depicts a perspective view of a portion of another embodiment of the present cooling assemblies with a plurality of bars disposed in a rotor core.
Figure 3:
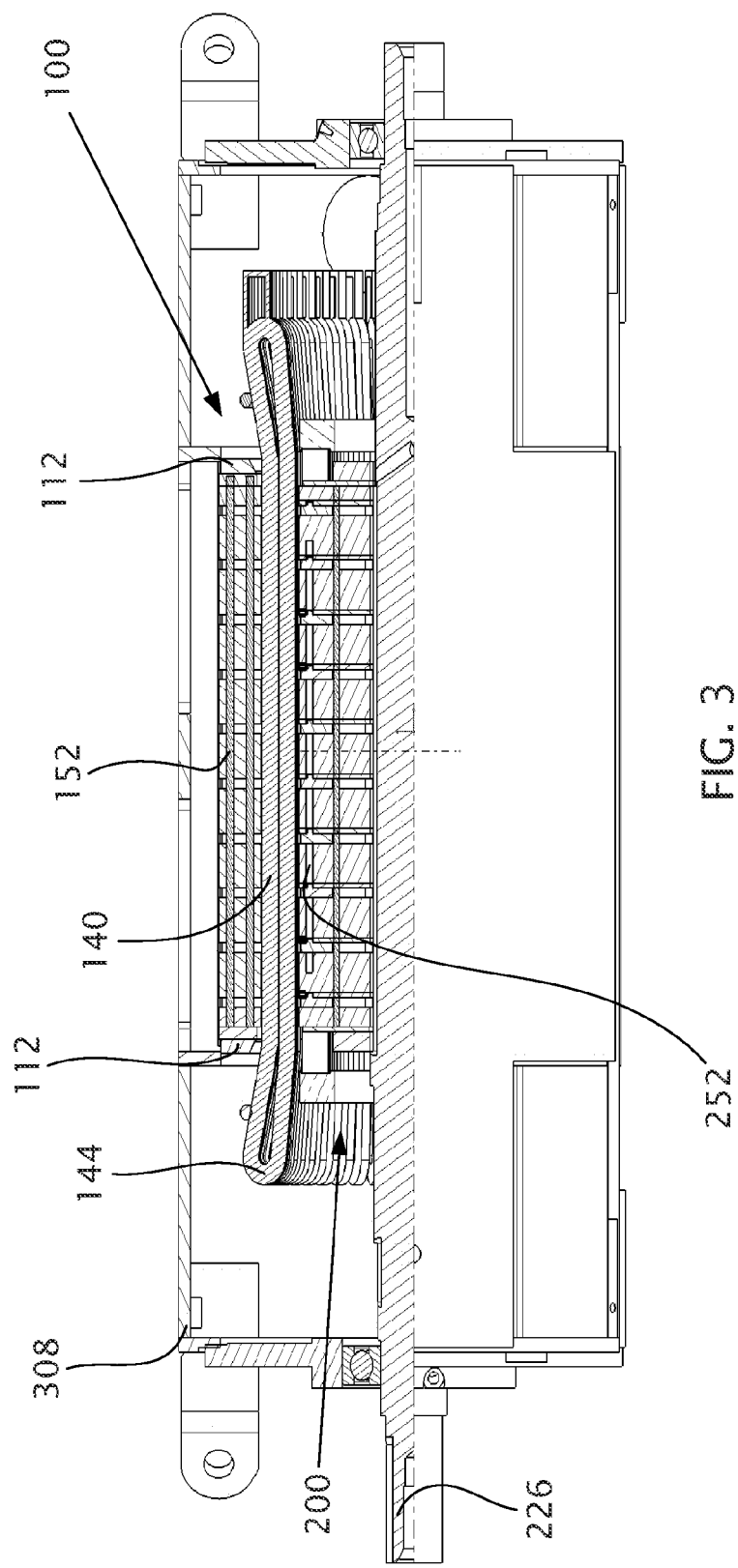
FIG. 3 depicts a cross-sectional view of an embodiment of the present cooling assemblies with a plurality of bars disposed in a stator core and a plurality of bars disposed in a rotor core.
Figure 4:
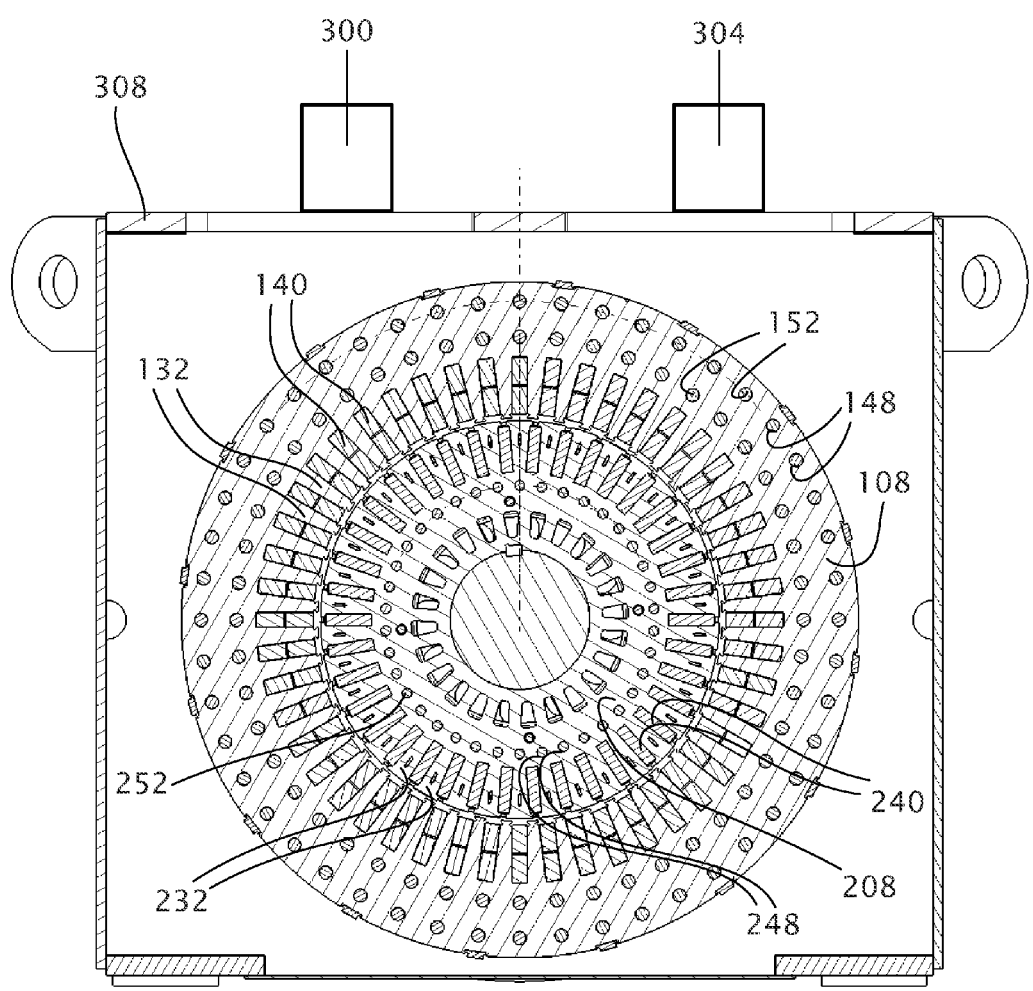
FIG. 4 depicts another cross-sectional view of the cooling assembly of FIG. 3.

FIGS. 1-6 depict embodiments of the present cooling assemblies—cooling assembly 100 and cooling assembly 200. Cooling assemblies 100 and 200 can be used independently (e.g., as depicted in FIGS. 1-2 and 5-6) or can cooperate (e.g., as depicted in FIGS. 3-4) to cool an electric machine. Cooling assemblies 100 and 200 provide various advantages to electric machines (e.g., electric motors and generators). For example, cooling assemblies 100 and 200 are configured to increase the power density of an electric machine (e.g., by lowering an operating temperature of an electric machine to permit the machine to operate at a higher power level without overheating). As another example, cooling assemblies 100 and/or 200 can cool an electric machine without a cooling jacket (e.g., potentially decreasing weight and/or size of an electric machine, eliminating issues relating to high shrink fit pressure of a jacket frame, eliminating the need to machine a stator outer diameter and jacket inner diameter that optimizes fluid cooling performance, and the like); though in some embodiments, a cooling jacket can cooperate with cooling assemblies 100 and/or 200 to provide additional cooling, if necessary, to an electric machine.

Figure 5:
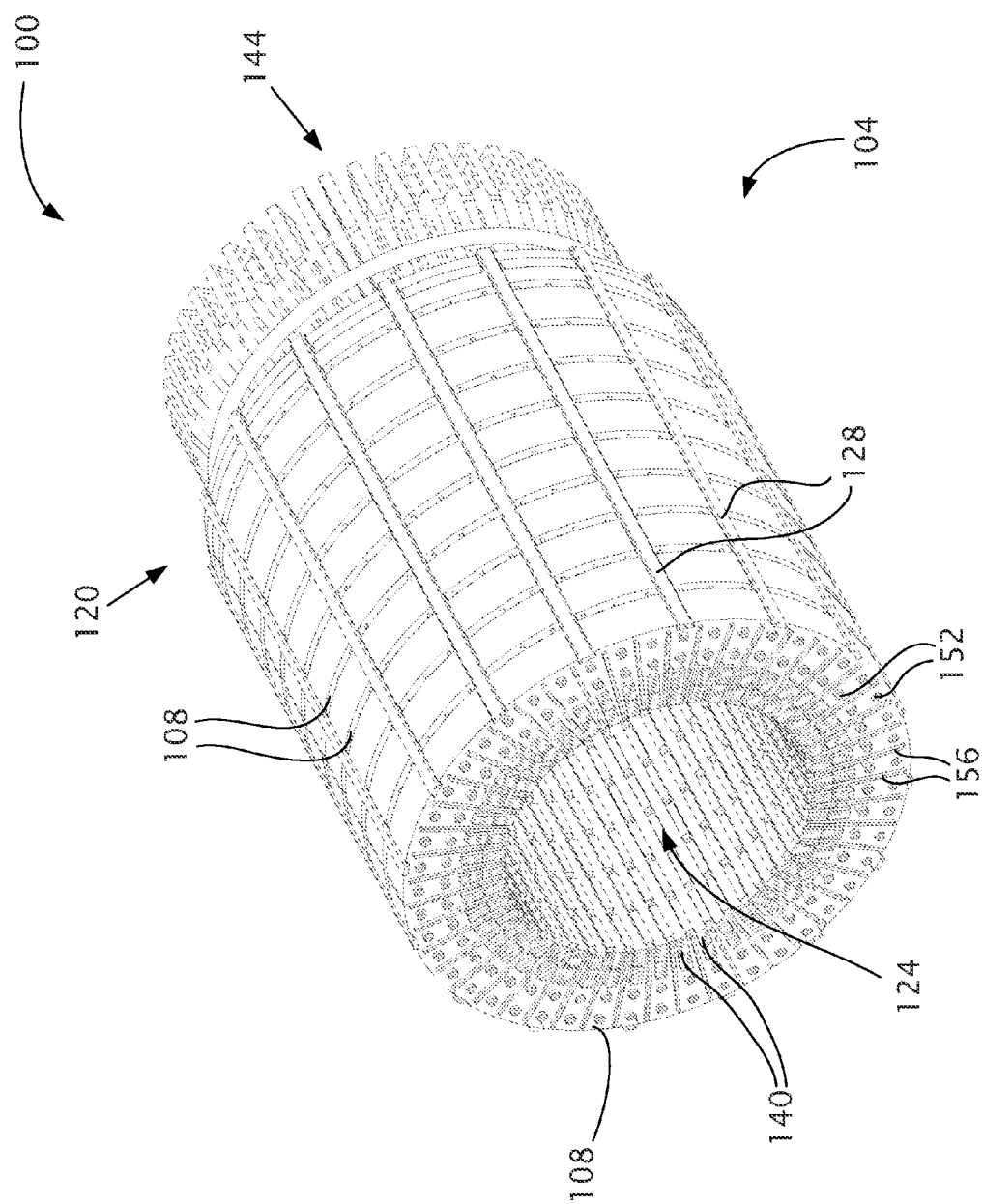
FIG. 5 depicts a cross-sectional view of a portion of the cooling assembly of FIG. 1.

In the embodiment shown in FIGS. 1 and 5, cooling assembly 100 comprises stator core 104. Stator core 104 comprises plurality of laminations 108. Plurality of laminations 108 are not shown individually, but are depicted in an assembled configuration (e.g., stacked). Each lamination in plurality of laminations 108 can be coupled to adjacent laminations (e.g., by riveting, bolting, welding, bonding, brazing, dimpling, and the like) in plurality of laminations 108 and/or can be prevented from moving away from adjacent laminations in plurality of laminations 108 (e.g., by one or more end plates 112). Plurality of laminations 108 can comprise various materials, including, for example, silicon steel, carbon steel, cold rolled steel, nickel alloys, cobalt alloys, and the like. In the embodiment shown, stator core 104 has first end 116, second end 120, and bore 124. Bore 124 extends from first end 116 to second end 120 and is configured to accommodate at least a portion of a rotor (discussed in detail below). Bore 124 is characterized by a longitudinal axis (e.g., which can coincide with the axis of rotation of a corresponding rotor core). In the embodiment shown, stator core 104 also comprises plurality of cross bars 128 extending longitudinally with respect to stator core 104 (e.g., parallel to bore 124) and coupled to at least one lamination of plurality of laminations 108 and/or end plates 112.

In the embodiment shown, each lamination in plurality of laminations 108 comprises plurality of teeth 132 extending toward bore 124 of stator core 104. In the embodiment shown, cooling assembly 100 further comprises plurality of windings 140 disposed between adjacent teeth of plurality of teeth 132. Plurality of windings 140 comprise winding end turns 144, which extend from first end 116 and second end 120 of stator core 104. Each winding in plurality of windings 140 can be disposed between and/or be coupled to adjacent teeth in plurality of teeth 132 by any suitable means, including, for example, by injection. Further, plurality of windings 140 can comprise any suitable material, including, for example, copper, aluminum, alloys thereof, and the like.

At least some laminations in plurality of laminations 108 comprise at least one opening 148 (e.g., a plurality of openings 148, in the embodiment shown) positioned at least between first end 116 and second end 120 of stator core 104. For example, in some embodiments, opening(s) 148 can extend from first end 116 to second end 120 of stator core 104 (e.g., such that substantially all of plurality of laminations 108 comprise opening(s) 148). In other embodiments, opening(s) 148 can extend between first end 116 and second end 120 (e.g., such that opening(s) 148 terminate(s) prior to first end 116 and/or second end 120). Opening(s) 148 also can extend continuously or discontinuously at least between first end 116 and second end 120 (e.g., such that opening(s) 148 comprise(s) multiple, distinct segments). In the embodiment shown, each opening in plurality of openings 148 is—but is not required to be—substantially parallel to bore 124 of stator core 104. Furthermore, in the embodiment shown, each opening in plurality of openings 148 is—but is not required to be—equidistant from the adjacent openings in plurality of openings 148 (e.g., adjacent openings that comprise substantially the same distance from the longitudinal axis of bore 124 of stator core 104).

In the embodiment shown, cooling assembly 100 further comprises—but is not required to comprise—a plurality of layers of openings 148, where each layer comprises plurality of openings 148 that are substantially equidistant from the longitudinal axis of bore 124 of stator core 104 (e.g., each layer forming a substantially circular configuration around bore 124 of stator core 104, as depicted in FIG. 4). For example, each layer in the plurality of layers can comprise plurality of openings 148 that are a different distance from the longitudinal axis of bore 124 of stator core 104 than are plurality of opening(s) 148 in each of the other layers (e.g., such that each layer is substantially concentric with other layers). As explained above, each opening 148 in plurality of openings 148 in a layer can be—but is not required to be—equidistant from adjacent openings in plurality of openings 148 in the same layer. In some embodiments, opening(s) 148 in one layer can comprise a different configuration than opening(s) 148 in other layers (e.g., a larger/smaller diameter, a different shape, and the like). Each layer can comprise the same or a different number of opening(s) 148 as compared to other layers (e.g., the same number of opening(s) 148, in the embodiment shown). At least some of plurality of openings 148 can be configured to be in proximity to or in contact with plurality of stator windings 140 (e.g., to permit heat to transfer from stator windings 140 and/or plurality of laminations 108 into bars disposed within opening(s) 148 (discussed in detail below)).

Cooling assembly 100 further comprises at least one bar 152 (e.g., plurality of bars 152, in the embodiment shown) disposed in at least one opening 148 (e.g., plurality of openings 148, in the embodiment shown) of plurality of laminations 108. Bar(s) 152 can be configured to be disposed in any suitable configuration of opening(s) 148. For example, in the embodiment shown, bar(s) 152 are disposed in opening(s) 148 at least between first end 116 and second end 120 of stator core 104. Similarly to opening(s) 148, in some embodiments, bar(s) 152 can be positioned in opening(s) 148 and can extend from first end 116 to second end 120 of stator core 104 (e.g., such that bar(s) 152 extend(s) through substantially all of plurality of laminations 108). In other embodiments, bar(s) 152 can be positioned in opening(s) 148 and can extend between first end 116 and second end 120 (e.g., such that bar(s) 152 terminate(s) prior to first end 116 and/or second end 120). Bar(s) 152 also can extend continuously (e.g., comprising one segment) or discontinuously (e.g., comprising multiple, distinct segments) at least between first end 116 and second end 120 of stator core 104. At least one end plate 112 (e.g., two end plates 112, in the embodiment shown) can be disposed at first end 116 and/or second end 120 of stator core 104 to prevent bar(s) 152 from moving longitudinally with respect to opening(s) 148. In some embodiments, bar(s) 152 are coupled to at least one end plate 112; and in some embodiments, at least one end plate 112 compresses bar(s) 152.

Bar(s) 152 can comprise any suitable shape configured to be disposed within opening(s) 148. For example, bar(s) 152 can comprise a substantially similar shape as opening(s) 148 (e.g., cylindrical), as in the embodiment shown. As with opening(s) 148, bar(s) 152 positioned in opening(s) 148 of one layer of the plurality of layers can comprise a different configuration than bar(s) 152 positioned in opening(s) 148 in other layers of the plurality of layers (e.g., a larger/smaller diameter, a different shape, and the like). For example, bar(s) 152 of a layer closest to windings 140 can comprise a larger diameter than bar(s) 152 of a layer farther from windings 140. In some embodiments, bar(s) 152 of a layer closest to windings 140 can comprise the largest diameter of bar(s) 152 disposed in stator core 104, with bar(s) 152 decreasing in diameter as a distance of a respective layer increases from windings 140. Conversely, in other embodiments, bar(s) 152 of a layer closest to windings 140 can comprise a smaller diameter than bar(s) 152 of a layer farther from windings 140. In other embodiments, bar(s) 152 of a layer closest to windings 140 can comprise the smallest diameter of bar(s) 152 disposed in stator core 104, with bar(s) 152 increasing in diameter as a distance of a respective layer increases from windings 140. Bar(s) 152 also can comprise any suitable shape configured to maximize heat transfer into bar(s) 152 from plurality of laminations 108, plurality of windings 140, and/or other components of cooling assembly 100 near bar(s) 152.

In the embodiment shown, at least one bar 152 can be electrically insulated from at least some laminations in plurality of laminations 108. For example, at least one bar 152 can be a dielectric having a dielectric strength of equal to or greater than 40 Volts per mil (V/mil) (e.g., 50 V/mil, 60 V/mil, 70 V/mil, etc.). Further at least one bar 152 can be thermally conductive having a thermal conductivity of equal to or greater than 20 W/m-K (e.g., 30 W/m-K, 40 W/m-K, 50 W/m-K, etc.). In some embodiments, at least one bar 152 is not hollow (e.g., comprising a solid interior). In some embodiments, an interior of at least one bar 152 is not in fluid communication with a fluid source. At least one bar 152 additionally may not share a respective opening 148 with another component of stator core 104. At least one bar 152 can be porous (e.g., such that the bar comprises a lower density) or non-porous (e.g., depending on a desired thermal conductivity, a desired dielectric strength, a desired weight, a desired composition, etc.). Further, at least one bar 152 can comprise any combination of the aforementioned characteristics and can comprise any suitable material configured to achieve such characteristics, such as, for example, ceramic (e.g., alumina, high purity alumina, beryllia, etc.).

In the embodiment shown, cooling assembly 100 comprises—but is not required to comprise—plurality of members 156. Plurality of members 156 can be disposed between (e.g., in contact with) at least two adjacent laminations 108 of plurality of laminations 108 such that adjacent laminations 108 form at least one channel 160 that extends at least partially around stator core 104. In the embodiment shown, plurality of members 156 are disposed between more than two adjacent laminations 108 of plurality of laminations 108 such that more than two adjacent laminations 108 form a plurality of channels 160 extending at least partially around stator core 104 (e.g., ten channels 160, in the embodiment shown). Plurality of members 156 are disposed such that heat can transfer from bar(s) 152, through channel(s) 160, and out of stator core 104. In some embodiments, plurality of members 156 are configured to extend between and/or contact at least some adjacent windings of plurality of windings 140. In the embodiment shown, plurality of channels 160 are substantially equidistant from one another, but are not required to be. Similarly, between adjacent laminations, plurality of members 156 are substantially equidistant from one another around stator core 104, but are not required to be. Plurality of members 156 can comprise any suitable shape, such as, for example, a substantially rectangular shape, a substantially square shape, a substantially cylindrical shape, an i-beam, and the like. Further, plurality of members 156 can comprise—but are not required to comprise—any suitable thermally conductive material, such as copper, aluminum, steel, alloys thereof, and similar thermally conductive materials.

Figure 6:
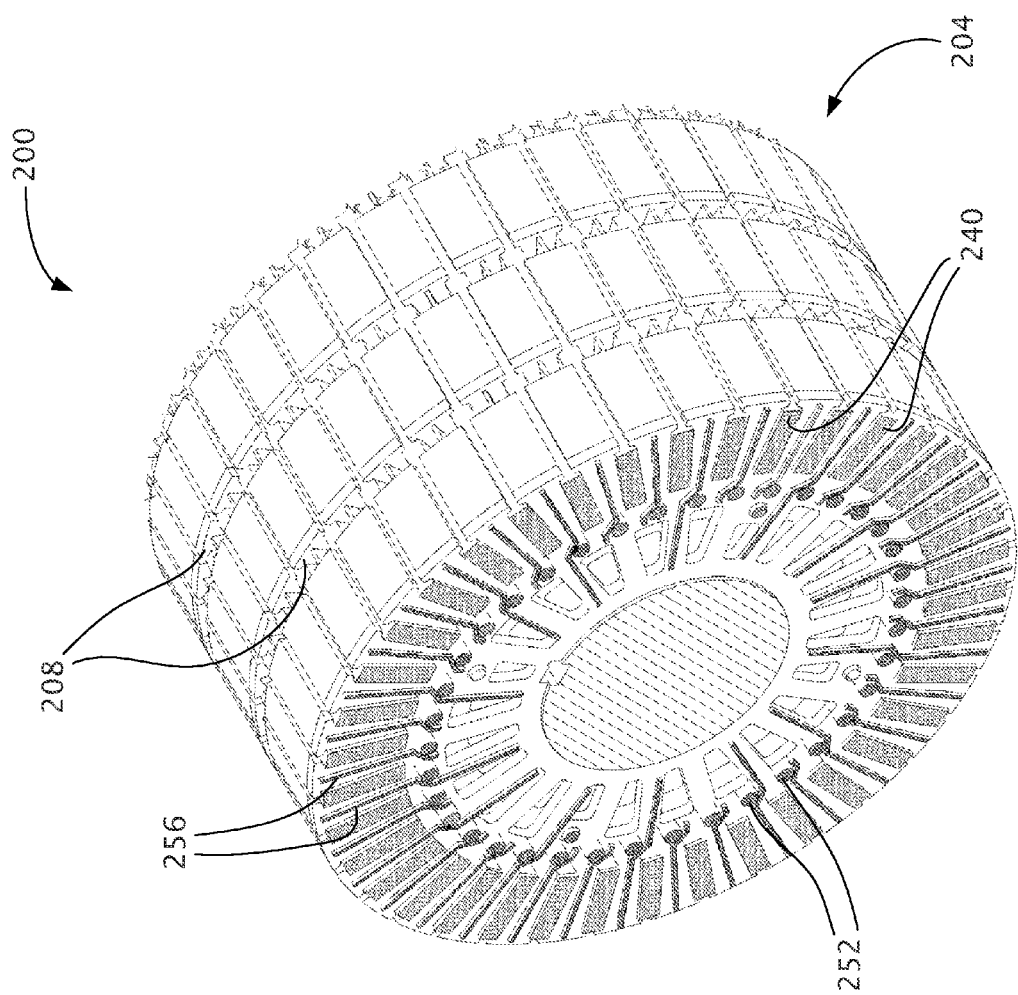
FIG. 6 depicts a cross-sectional view of a portion of the cooling assembly of FIG. 2.

In the embodiment shown in FIGS. 2 and 6, cooling assembly 200 comprises rotor core 204. Rotor core 204 comprises plurality of laminations 208. Plurality of laminations 208 are not shown individually, but are depicted in an assembled configuration (e.g., stacked). Each lamination in plurality of laminations 208 can be coupled to adjacent laminations in plurality of laminations 208 (e.g., by riveting, bolting, welding, bonding, brazing, dimpling, and the like) and/or can be prevented from moving away from adjacent laminations in plurality of laminations 208 (e.g., by one or more end plates 212). Plurality of laminations 208 can comprise various materials, including, for example, silicon steel, carbon steel, cold rolled steel, nickel alloys, cobalt alloys, and the like. In the embodiment shown, rotor core 204 has first end 216, second end 220, and bore 224. Bore 224 extends from first end 216 to second end 220 and is configured to accommodate at least a portion of rotor shaft 226. Bore 224 is characterized by a longitudinal axis (e.g., which can coincide with the axis of rotation of rotor core 204). As discussed above, cooling assembly 200 is configured to be disposed in a stator core (e.g., bore 124 of stator core 104 of cooling assembly 100, as depicted in FIGS. 3-4).

In the embodiment shown, each lamination in plurality of laminations 208 comprises plurality of teeth 232 extending away from bore 224 of rotor core 204. In the embodiment shown, cooling assembly 200 further comprises plurality of windings 240 disposed between adjacent teeth of plurality of teeth 232. Each winding in plurality of windings 240 can be disposed between and/or be coupled to adjacent teeth in plurality of teeth 232 by any suitable means, including, for example, by injection. Further, plurality of windings 240 can comprise any suitable material, including, for example, copper, aluminum, alloys thereof, and the like.

At least some laminations in plurality of laminations 208 comprise at least one opening 248 (e.g., a plurality of openings 248, in the embodiment shown) positioned at least between first end 216 and second end 220 of rotor core 204. For example, in some embodiments, opening(s) 248 can extend from first end 216 to second end 220 of rotor core 204 (e.g., such that substantially all of plurality of laminations 208 comprise opening(s) 248). In other embodiments, opening(s) 248 can extend between first end 216 and second end 220 (e.g., such that opening(s) 248 terminate(s) prior to first end 216 and/or second end 220). Opening(s) 248 also can extend continuously or discontinuously at least between first end 216 and second end 220 (e.g., such that opening(s) 248 comprise(s) multiple, distinct segments). In the embodiment shown, each opening in plurality of openings 248 is—but is not required to be—substantially parallel to bore 224 of rotor core 204. Furthermore, in the embodiment shown, each opening in plurality of openings 248 is—but is not required to be—equidistant from the adjacent openings in plurality of openings 248 (e.g., adjacent openings that comprise substantially the same distance from the longitudinal axis of bore 224 of rotor core 204).

In the embodiment shown, cooling assembly 200 further comprises—but is not required to comprise—a plurality of layers of openings 248, where each layer comprises plurality of openings 248 that are substantially equidistant from the longitudinal axis of bore 224 of rotor core 204. For example, each layer in the plurality of layers can comprise plurality of openings 248 that are a different distance from the longitudinal axis of bore 224 of rotor core 204 than are plurality of opening(s) 248 in each of the other layers (e.g., such that each layer is substantially concentric with other layers). As explained above, each opening 248 in plurality of openings 248 in a layer can be—but is not required to be—equidistant from adjacent openings in plurality of openings 248 in the same layer. In some embodiments, opening(s) 248 in one layer can comprise a different configuration than opening(s) 248 in other layers (e.g., a larger/smaller diameter, a different shape, and the like). Each layer can comprise the same or a different number of opening(s) 248 as compared to other layers (e.g., a different number of opening(s) 248, in the embodiment shown). At least some of plurality of openings 248 can be configured to be in proximity or in contact with to plurality of rotor windings 240 (e.g., to permit heat to transfer from rotor windings 240 and/or plurality of laminations 208 into bars disposed within opening(s) 248 (discussed in detail below).

Cooling assembly 200 further comprises at least one bar 252 (e.g., plurality of bars 252, in the embodiment shown) disposed in at least one opening(s) 248 (e.g., plurality of openings 248, in the embodiment shown) of plurality of laminations 208. Bar(s) 252 can be configured to be disposed in any suitable configuration of opening(s) 248. For example, in the embodiment shown, bar(s) 252 are disposed in opening(s) 248 at least between first end 216 and second end 220 of rotor core 204. Similarly to opening(s) 248, in some embodiments, bar(s) 252 can be positioned in opening(s) 248 and can extend from first end 216 to second end 220 of rotor core 204 (e.g., such that bar(s) 252 extend(s) through substantially all of plurality of laminations 208). In other embodiments, bar(s) 252 can be positioned in opening(s) 248 and can extend between first end 216 and second end 220 (e.g., such that bar(s) 252 terminate(s) prior to first end 216 and/or second end 220). Bar(s) 252 also can extend continuously (e.g., comprising one segment) or discontinuously (e.g., comprising multiple, distinct segments) at least between first end 216 and second end 220 of rotor core 204. At least one end plate 212 (e.g., two end plates 212, in the embodiment shown) can be disposed at first end 216 and second end 220 of rotor core 204 to prevent bar(s) 252 from moving longitudinally with respect to opening(s) 248. In some embodiments, bar(s) 252 are coupled to at least one end plate 212; and in some embodiments, at least one end plate 212 compresses bar(s) 252.

Bar(s) 252 can comprise any suitable shape configured to be disposed within opening(s) 248. For example, bar(s) 252 can comprise a substantially similar shape to opening(s) 248 (e.g., cylindrical), as in the embodiment shown. As with opening(s) 248, bar(s) 252 positioned in opening(s) 248 of one layer of plurality of layers can comprise a different configuration than bar(s) 252 positioned in opening(s) 248 in other layers of the plurality of layers (e.g., a larger/smaller diameter, a different shape, and the like). For example, bar(s) 252 of a layer closest to windings 240 can comprise a larger diameter than bar(s) 252 of a layer farther from windings 240. In some embodiments, bar(s) 252 of a layer closest to windings 240 can comprise the largest diameter of bar(s) 252 disposed in stator core 204, with bar(s) 252 decreasing in diameter as a distance of a respective layer increases from windings 240. Conversely, in other embodiments, bar(s) 252 of a layer closest to windings 240 can comprise a smaller diameter than bar(s) 252 of a layer farther from windings 240. In other embodiments, bar(s) 252 of a layer closest to windings 240 can comprise the smallest diameter of bar(s) 252 disposed in stator core 204, with bar(s) 152 increasing in diameter as a distance of a respective layer increases from windings 240. Bar(s) 252 also can comprise any suitable shape configured to maximize heat transfer into bar(s) 252 from plurality of laminations 208, plurality of windings 240, and/or other components of cooling assembly 200 near bar(s) 252.

In the embodiment shown, at least one bar 252 can be electrically insulated from at least some laminations in plurality of laminations 208. For example, at least one bar 252 can be a dielectric having a dielectric strength of equal to or greater than 40 Volts per mil (V/mil) (e.g., 50 V/mil, 60 V/mil, 70 V/mil, etc.). Further at least one bar 252 can be thermally conductive having a thermal conductivity of equal to or greater than 20 W/m-K (e.g., 30 W/m-K, 40 W/m-K, 50 W/m-K, etc.). In some embodiments, at least one bar 252 is not hollow (e.g., comprising a solid interior). In some embodiments, an interior of at least one bar 252 is not in fluid communication with a fluid source. At least one bar 252 additionally may not share a respective opening 248 with another component of rotor core 204. At least one bar 252 can be porous (e.g., such that the bar comprises a lower density) or non-porous (e.g., depending on a desired thermal conductivity, a desired dielectric strength, a desired weight, a desired composition, etc.). Further, at least one bar 252 can comprise any combination of the aforementioned characteristics and can comprise any suitable material configured to achieve such characteristics, such as, for example, ceramic (e.g., alumina, high purity alumina, beryllia, etc.).

In the embodiment shown, cooling assembly 200 comprises—but is not required to comprise—plurality of members 256. Plurality of members 256 can be disposed between (e.g., in contact with) at least two adjacent laminations 208 of plurality of laminations 208 such that adjacent laminations 208 form at least one channel 260 that extends at least partially around rotor core 204. In the embodiment shown, plurality of members 256 are disposed between more than two adjacent laminations 208 of plurality of laminations 208 such that more than two adjacent laminations 208 form a plurality of channels 260 extending at least partially around stator core 204 (e.g., ten channels 260, in the embodiment shown). Plurality of members 256 are disposed such that heat can transfer from bar(s) 252, through channel(s) 260, and out of rotor core 204. In some embodiments, plurality of members 256 are configured to extend between and/or contact at least some adjacent windings of plurality of windings 240. In the embodiment shown, plurality of channels 260 are substantially equidistant from one another, but are not required to be. Similarly, between adjacent laminations, plurality of members 256 are substantially equidistant from one another around rotor core 204, but are not required to be. Plurality of members 256 can comprise any suitable shape, such as, for example, a substantially rectangular shape, a substantially square shape, a substantially cylindrical shape, an i-beam, and the like. Further, plurality of members 256 can comprise—but are not required to comprise—any suitable thermally conductive material, such as copper, aluminum, steel, alloys thereof, and similar thermally conductive materials.

In the embodiment shown, cooling assemblies 100 and/or 200 can include various means of increasing thermal contact and/or conductivity between bar(s) 152 and 252, plurality of laminations 108 and 208, and/or plurality of members 156 and 256, respectively. For example, cooling assemblies 100 and 200 can comprise thermal interface material disposed between bar(s) 152 and 252, plurality of laminations 108 and 208, and/or plurality of members 156 and 256, respectively, to increase heat transfer. Thermal interface material can include, but is not limited to, thermal greases (e.g., silicone-based greases, sodium silicate-based greases, polyethylene glycol-based greases, etc.), resilient thermal conductors (e.g., conducting particle filled elastomers), solder, thermal fluids (e.g., mineral oil), and the like. In some embodiments, thermal interface material can—but is not required to—have a high fluidity to minimize the thickness of thermal interface material after being disposed on bar(s) 152 and 252, plurality of laminations 108 and 208, and/or plurality of members 156 and 256, respectively. In other embodiments, thermal interface material can—but is not required to—have a high filler content to, for example, increase thermal contact and/or conductivity between bar(s) 152 and 252, plurality of laminations 108 and 208, and/or plurality of members 156 and 256, respectively. As another example, cooling assemblies 100 and/or 200 can comprise vacuum pressure impregnation (VPI) resin (e.g., epoxy, polyester, combinations thereof, and the like) disposed on bar(s) 152 and 252, plurality of laminations 108 and 208, and/or plurality of members 156 and 256 via vacuum pressure impregnation.

As depicted in FIG. 4, cooling assemblies 100 and/or 200 can further comprise—but are not required to comprise—heat exchanger 300. Heat exchanger 300 (e.g., an air to liquid heat exchanger) can be in fluid communication with cooling assemblies 100 and/or 200 to permit heat from cooling assemblies 100 and/or 200 (e.g., from the internal air) to be removed from the assemblies. Similarly, cooling assemblies 100 and/or 200 can also comprise—but are not required to comprise—air blower 304 (e.g., an internal air blower and/or external air blower) configured to circulate cooled air through cooling assemblies 100 and/or 200 (e.g., to remove heat from components of cooling assemblies 100 and/or 200).

As shown in FIGS. 3-4, cooling assemblies 100 and/or 200 can be at least partially disposed within frame 308. Frame 308 can have a substantially similar shape to cooling assemblies 100 and/or 200 (e.g., cylindrical); however, in the embodiment shown, frame 308 comprises a substantially rectangular shape. In other embodiments, frame 308 can comprise any suitable shape configured to at least partially receive cooling assemblies 100 and/or 200 (e.g., square).

As described in detail above, certain components of cooling assemblies 100 and/or 200 can comprise various thermally conductive materials (e.g., metals and non-metals) configured to improve heat transfer through such components, including, but not limited to, steel, carbon steel, aluminum, copper, silver, gold, lead, and combinations and/or alloys thereof. In other embodiments, however, certain components of cooling assemblies 100 and/or 200 can comprise materials of lower conductivity. Further, such components can comprise thin, light weight, and/or low density materials to improve heat transfer and/or minimize the weight of cooling assemblies 100 and/or 200.

The present disclosure also comprises methods of manufacturing cooling assemblies for an electric machine (e.g., cooling assemblies 100 and/or 200). Such methods can comprise cutting at least one opening (e.g., at least one opening 148) in at least some of a plurality of stator laminations (e.g., stator laminations 108) such that when the at least some stator laminations are assembled, the at least one opening is positioned at least between a first end and a second end of a stator core (e.g., first end 116 and second end 120 of stator core 104); assembling the plurality of stator laminations to form at least a portion of a stator core; and disposing at least one bar (e.g., at least one bar 152) in the at least one opening. In some embodiments, the at least one bar is not hollow. In some embodiments, the at least one bar is electrically insulated from the at least some laminations (e.g., a dielectric). In some embodiments, an interior of the at least one bar is not in fluid communication with a fluid source. In some embodiments, the at least one bar is disposed in the at least one opening of the at least some stator laminations prior to assembling the plurality of stator laminations; and in other embodiments, the at least one bar is disposed in the at least one opening of the at least some stator laminations after assembling some or all of the plurality of stator laminations.

In some embodiments, the methods can further comprise cutting a plurality of openings (e.g., plurality of openings 148) in at least some of a plurality of stator laminations (e.g., stator laminations 108) such that when the at least some stator laminations are assembled, the plurality of openings are positioned at least between the first end and the second end of the stator core; and disposing a bar in each of the plurality of openings (e.g., bars 152). As above, in some embodiments, the bar is not hollow. In some embodiments, the bar is electrically insulated from the at least some laminations (e.g., a dielectric). In some embodiments, an interior of the bar is not in fluid communication with a fluid source. In some embodiments, the bar is disposed in each of the plurality of openings prior to assembling the plurality of stator laminations; and in other embodiments, the bar is disposed in each of the plurality of openings after assembling some or all of the plurality of stator laminations. In some embodiments, the methods can further comprise disposing a plurality of members (e.g., members 156) between at least two adjacent laminations of the plurality of stator laminations to form at least one channel (e.g., at least one channel 160) at least partially around the stator core. In some embodiments, the methods further comprise disposing an epoxy resin between the one or more bars in each of the plurality of openings and the at least some stator laminations. In some embodiments, the methods comprise cutting at least one opening (e.g., at least one opening 248) in at least some of a plurality of rotor laminations (e.g., rotor laminations 208) such that when the at least some rotor laminations are assembled, the at least one opening is positioned at least between a first end and a second end of a rotor core (e.g., first end 216 and second end 220 of rotor core 204); assembling the plurality of rotor laminations to form at least a portion of a rotor core; disposing at least one bar (e.g., at least one bar 252) in the at least one opening, where the at least one bar is electrically insulated from the at least some rotor laminations and/or does not share an opening with another component of the rotor core; and disposing the rotor core at least partially in a bore (e.g., bore 124) of the stator core.

Such methods can also comprise cutting at least one opening (e.g., at least one opening 248) in at least some of a plurality of rotor laminations (e.g., rotor laminations 208) such that when the at least some rotor laminations are assembled, the at least one opening is positioned at least between a first end and a second end of a rotor core (e.g., first end 216 and second end 220 of rotor core 204); assembling the plurality of rotor laminations to form at least a portion of a rotor core; and disposing at least one bar (e.g., at least one bar 252) in the at least one opening. The at least one bar can be electrically insulated from the at least some laminations (e.g., a dielectric) and/or may not share an opening with a another component of the rotor core. In some embodiments, the at least one bar is disposed in the at least one opening of the at least some rotor laminations prior to assembling the plurality of rotor laminations; and in other embodiments, the at least one bar is disposed in the at least one opening of the at least some rotor laminations after assembling some or all of the plurality of rotor laminations.

In some embodiments, the methods can further comprise cutting a plurality of openings (e.g., plurality of openings 248) in at least some of a plurality of rotor laminations (e.g., rotor laminations 208) such that when the at least some rotor laminations are assembled, the plurality of openings are positioned at least between the first end and the second end of the rotor core; and disposing a bar in each of the plurality of openings (e.g., bars 252). As above, the bar can be electrically insulated from the at least some laminations (e.g., a dielectric) and/or may not share an opening with a another component of the rotor core. In some embodiments, the bar is disposed in each of the plurality of openings prior to assembling the plurality of rotor laminations; and in other embodiments, the bar is disposed in each of the plurality of openings after assembling some or all of the plurality of rotor laminations. In some embodiments, the methods can further comprise disposing a plurality of members (e.g., members 256) between at least two adjacent laminations of the plurality of rotor laminations to form at least one channel (e.g., at least one channel 260) at least partially around the rotor core. In some embodiments, the methods further comprise disposing an epoxy resin between the one or more bars in each of the plurality of openings and the at least some rotor laminations. In some embodiments, the methods comprise cutting at least one opening (e.g., at least one opening 148) in at least some of a plurality of stator laminations (e.g., stator laminations 108) such that when the at least some stator laminations are assembled, the at least one opening is positioned at least between a first end and a second end of a stator core (e.g., first end 116 and second end 120 of stator core 104); assembling the plurality of stator laminations to form at least a portion of a stator core; disposing at least one bar (e.g., at least one bar 152) in the at least one opening. In some embodiments, the at least one bar is not hollow. In some embodiments, the at least one bar is electrically insulated from the at least some stator laminations (e.g., a dielectric). In some embodiments, an interior of the at least one bar is not in fluid communication with a fluid source. In some embodiments, the method further comprises disposing the rotor core at least partially in a bore (e.g., bore 124) of the stator core.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A cooling assembly for an electric machine, comprising:
   a stator core comprising a plurality of single-piece laminations, the plurality of single-piece laminations including a plurality of teeth, and a plurality of windings, each winding in the plurality of windings having a portion disposed between adjacent teeth of the plurality of teeth, the stator core having:
   a first end;
   a second end; and
   a bore extending from the first end to the second end of the stator core and configured to accommodate at least a portion of a rotor, the bore characterized by a longitudinal axis;
   where at least some single-piece laminations in the plurality of single-piece laminations comprise at least one opening positioned at least between the first end and the second end of the stator core, entirely bordered by the at least some single-piece laminations, and radially aligned with a portion of a winding of the plurality of windings;
   at least one bar disposed in the at least one opening, where the at least one bar is not hollow and is electrically insulated from the at least some single-piece laminations; and
   a plurality of members disposed between at least two adjacent single-piece laminations such that the at least two adjacent single-piece laminations form at least one channel that extends at least partially around the stator core.

2. The cooling assembly of claim 1, further comprising:
   a plurality of openings in at least some single-piece laminations in the plurality of single-piece laminations, the openings positioned at least between the first end and the second end of the stator core; and
   a bar disposed in each of the plurality of openings, where the bar is not hollow and is electrically insulated from the at least some single-piece laminations;
   where each opening in the plurality of openings is substantially equidistant from the longitudinal axis of the bore of the stator core.

3. The cooling assembly of claim 2, where at least some single-piece laminations in the plurality of single-piece laminations further comprises:
   a plurality of layers of openings, each layer comprising a plurality of openings that are substantially equidistant from the longitudinal axis of the bore of the stator core.

4. The cooling assembly of claim 1, where the thermal conductivity of the at least one bar is equal to or greater than 20 W/m-K.

5. The cooling assembly of claim 1, where the dielectric strength of the at least one bar is equal to or greater than 40 V/mil.

6. The cooling assembly of claim 1, where the at least one bar comprises ceramic.

7. The cooling assembly of claim 1, further comprising:
   an end plate disposed at the first end; and
   an end plate disposed at the second end.

8. A cooling assembly for an electric machine, comprising:
   a stator core comprising a plurality of laminations, the plurality of laminations including a plurality of teeth, and a plurality of windings, each winding in the plurality of windings having a portion disposed between adjacent teeth of the plurality of teeth, the stator core having:
   a first end;
   a second end; and
   a bore extending from the first end to the second end of the stator core and configured to accommodate at least a portion of a rotor, the bore characterized by a longitudinal axis;

where at least some laminations in the plurality of laminations comprise at least two openings positioned at least between the first end and the second end of the stator core, the at least two openings radially aligned with each other and with a portion of a winding of the plurality of windings;

at least one bar disposed in one of the at least two openings, where the at least one bar is not hollow and is electrically insulated from the at least some laminations;

at least another bar disposed in another of the at least two openings, where the at least another bar is not hollow and is electrically insulated from the at least some laminations; and a plurality of members disposed between at least two adjacent laminations such that the at least two adjacent laminations form at least one channel that extends at least partially around the stator core.

9. The cooling assembly of claim 8, further comprising:
a plurality of openings in at least some laminations in the plurality of laminations, the openings positioned at least between the first end and the second end of the stator core; and a bar disposed in each of the plurality of openings, where the bar is not hollow and is electrically insulated from the at least some laminations;

where each opening in the plurality of openings is substantially equidistant from the longitudinal axis of the bore of the stator core.

10. The cooling assembly of claim 9, where at least some laminations in the plurality of laminations further comprises:
a plurality of layers of openings, each layer comprising a plurality of openings that are substantially equidistant from the longitudinal axis of the bore of the stator core.

11. The cooling assembly of claim 8, where the thermal conductivity of the at least one bar is equal to or greater than 20 W/m-K.

12. The cooling assembly of claim 8, where the dielectric strength of the at least one bar is equal to or greater than 40 V/mil.

13. The cooling assembly of claim 8, where the at least one bar comprises ceramic.

14. The cooling assembly of claim 8, further comprising:
an end plate disposed at the first end; and
an end plate disposed at the second end.

* * * * *